US011119740B2

(12) United States Patent
Mahajan et al.

(10) Patent No.: US 11,119,740 B2
(45) Date of Patent: Sep. 14, 2021

(54) PARSABILITY OF CODE SNIPPETS

(71) Applicant: FUJITSU LIMITED, Kawasaki (JP)

(72) Inventors: Sonal Mahajan, Fremont, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/737,816

(22) Filed: Jan. 8, 2020

(65) Prior Publication Data
US 2021/0208857 A1   Jul. 8, 2021

(51) Int. Cl.
G06F 8/41 (2018.01)
G06F 11/36 (2006.01)
G06F 8/33 (2018.01)

(52) U.S. Cl.
CPC .............. G06F 8/425 (2013.01); G06F 8/33 (2013.01); G06F 8/427 (2013.01); G06F 11/3608 (2013.01)

(58) Field of Classification Search
CPC ...................................................... G06F 8/427
USPC ......................................................... 717/143
See application file for complete search history.

(56) References Cited

U.S. PATENT DOCUMENTS

| | | | |
|---|---|---|---|
| 7,725,884 B2* | 5/2010 | Ramani | G06F 8/41 717/143 |
| 8,756,576 B2* | 6/2014 | Balasubramanian | G06F 11/3664 717/125 |
| 9,009,729 B2* | 4/2015 | Findeisen | G06F 11/3419 719/313 |
| 9,110,769 B2* | 8/2015 | Zhang | G06F 8/751 |
| 9,710,243 B2* | 7/2017 | O'Hara | G06F 8/71 |
| 9,965,633 B2* | 5/2018 | Brucker | H04L 63/1433 |
| 10,545,737 B2* | 1/2020 | Puszkiewicz | G06F 9/45512 |
| 10,664,383 B2* | 5/2020 | Saha | G06F 11/3616 |
| 10,705,809 B2* | 7/2020 | Makkar | G06F 8/36 |
| 2010/0042976 A1* | 2/2010 | Hines | G06F 11/3466 717/127 |
| 2011/0239188 A1* | 9/2011 | Lindsey | G06F 8/72 717/117 |
| 2017/0185783 A1* | 6/2017 | Brucker | H04L 63/1433 |
| 2017/0300306 A1* | 10/2017 | De | G06F 8/427 |
| 2018/0060068 A1* | 3/2018 | Ferrara | G06N 20/00 |
| 2018/0089065 A1* | 3/2018 | Yoshida | G06F 11/3664 |
| 2018/0165182 A1* | 6/2018 | Yoshida | G06F 11/3644 |
| 2018/0365318 A1* | 12/2018 | Yi | G06F 16/951 |
| 2019/0079741 A1* | 3/2019 | Makkar | G06F 8/75 |

(Continued)

OTHER PUBLICATIONS

Goloveshkin A.V., Mikhalkovich S.S. Tolerant parsing with a special kind of "Any" symbol: the algorithm and practical application. Trudy ISP RAN/Proc. ISP RAS, vol. 30, issue 4, 2018. pp. 7-28. DOI: 10.15514/ISPRAS-2018-30(4)-1.*

(Continued)

Primary Examiner — Francisco J Aponte
(74) Attorney, Agent, or Firm — Maschoff Brennan

(57) ABSTRACT

Operations may include obtaining a code artifact in which the code artifact is a code snippet is of a software language of interest. The operations may also include identifying fault locations of the code snippet that each correspond to a parsing error. In addition, the operations may include implementing repairs for each identified fault location in which, for each fault location, a respective repair is implemented for its corresponding parsing error such that the code snippet is modified into a parsable code snippet.

15 Claims, 14 Drawing Sheets

(56) References Cited

U.S. PATENT DOCUMENTS

| | | | | |
|---|---|---|---|---|
| 2019/0114157 | A1* | 4/2019 | Makkar | G06F 9/30094 |
| 2019/0228319 | A1* | 7/2019 | Gupta | G06N 5/04 |
| 2019/0303141 | A1* | 10/2019 | Li | G06F 16/9038 |
| 2020/0097261 | A1* | 3/2020 | Smith | G06N 3/0454 |
| 2020/0117446 | A1* | 4/2020 | Smith | G06N 3/0445 |
| 2020/0351092 | A1* | 11/2020 | Madhuram | G06F 8/34 |
| 2021/0117305 | A1* | 4/2021 | Raszka | G06N 3/08 |

OTHER PUBLICATIONS

Eric Horton et al. "Gistable: Evaluating the Executability of Python Code Snippets on GitHub"; NC State University Raleigh, NC, USA—2018 IEEE International Conference on Software Maintenance and Evolution.*

Alexander William Wong et al. "Syntax and Stack Overflow: A methodology for extracting a corpus of syntax errors and fixes"; Department of Computing Science, University of Alberta Edmonton, Alberta, Canada—2019 IEEE International Conference on Software Maintenance and Evolution (ICSME).*

Qing Gao et al. "Fixing Recurring Crash Bugs via Analyzing Q&A Sites"; 2015 30th IEEE/ACM International Conference on Automated Software Engineering (ASE).*

Andrius Merkys et al. "COD::CIF::Parser: an error-correcting CIF parser for the Perl language"; Journal of Applied Crystallography (JAC)—J.Appl. Cryst. (2016).*

"From Query to Usable Code: An Analysis of Stack Overflow Code Snippets" (Yang et al., MSR'16) May 14, 2016.

"CSNippex: Automated Synthesis of Compilable Code Snippets from Q&A Sites" (Terragniet et al., ISSTA'16) Jul. 18, 2016.

"Mining StackOverflow for Program Repair" (Liu et al., SANER'18) Mar. 2018.

"Detecting API Documentation Errors pair" (Zhong et al., OOPSLA'13) Nov. 2013.

"Live API Documentation" (Subramanian et al., ICSE'14) May 2014.

"Making Sense of Online Code Snippets" (Subramanian et al., MSR'13) May 18, 2013.

"FaCoY—A Code-to-Code Search Engine" (Kim et al., ICSE'18) May 2018.

"DeepDelta: Learning to Repair Compilation Errors" (Mesbah et al., FSE'19) Aug. 26, 2019.

"Enabling static analysis for partial Java programs" (Dagenais et al., OOPSLA'08) Oct. 2008.

"Mining StackOverflow to Turn the IDE into a Self-Confident Programming Prompter" (Ponzanelli et al., MSR'14) May 2014.

L. Ponzanelli, et al., "Supporting software developers with a holistic recommender system," in Proceedings of the 39th International Conference on Software Engineering. May 2017.

"Analyzing and Supporting Adaptation of Online Code Examples" (Zhang et al., ICSE'19) May 25, 2019.

"Recovering traceability links between an API and its learning resources" (Dagenais et al., ICSE'12) May 2012.

Chen et al., "Crowd debugging," Proc. of the 10th ACM Joint Meeting on Foundations of Software Engineering (FSE'15) Aug. 2015.

"Automatically finding patches using genetic programming," (Weimer et al., ICSE'09) May 2009.

"An Analysis of Patch Plausibility and Correctness for Generate-and-Validate Patch Generation Systems" (Long et al., ISSTA'15) Jul. 2015.

"Automatic Patch Generation by Learning Correct Code" (Long et al., POPL'16) Jan. 2016.

"Automatic Patch Generation Learned from Human-Written Patches" (Kim et al., ICSE'13) May 2013.

"Dynamic Patch Generation for Null Pointer Exceptions Using Metaprogramming" (Durieux et al., SANER'17) Feb. 2017.

"Elixir: an automated repair tool for Java programs" (Saha et al., IEEE'18) May 2018.

"Automatic Inference of Code Transforms for Patch Generation" (Long et al., FSE'17) Sep. 2017.

"Learning Syntactic Program Transformations from Examples" (Rolim et al., ICSE'17) May 2017.

"Phoenix: Automated Data-Driven Synthesis of Repairs for Static Analysis Violations" (Yoshida el al., FSE'19) Aug. 2019.

* cited by examiner

PARSABILITY OF CODE SNIPPETS

FIELD

The embodiments discussed in the present disclosure are related to improving the parsability of code snippets.

BACKGROUND

Software developer forums present a rich, hybrid knowledge base of natural language descriptions and code snippets related to developing software programs such as fixing errors (also referred to as bugs or violations) in the software programs. Software development tools may be configured to perform machine analysis operations to extract and process code snippets from the forums for use in the development process. However, a vast majority of code snippets on such developer forums tend to be syntactically incongruent with their corresponding software language, which may make them unparsable and unsuitable for machine analysis. Further, the snippets may also contain natural language fragments, which may not be recognized by automated code analysis techniques for parsing. These problems restrict the use of code snippets on developer forums to only a small set of machine analyzable snippets.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

Operations may include obtaining a code artifact in which the code artifact is a code snippet is of a software language of interest. The operations may also include identifying fault locations of the code snippet that each correspond to a parsing error. In addition, the operations may include implementing repairs for each identified fault location in which, for each fault location, a respective repair is implemented for its corresponding parsing error such that the code snippet is modified into a parsable code snippet.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
FIG. 1A is a diagram representing an example environment related to modifying unparsable code snippets such that they are parsable.

Some embodiments described in the present disclosure relate to methods and systems of making unparsable code snippets parsable such that the code snippets may be analyzed by software development tools that perform automated code analysis. For instance, code artifacts may include text that may include portions of code of a software language of interest (referred to as "code snippets"). However, the code artifacts may be syntactically incongruent with respect to the language of interest such that the code artifacts may be unparsable by the software development tools with respect to the language of interest. For example, the code snippets of the code artifacts may be missing syntactic characters (e.g., brackets, semi-colons, etc.), may have extraneous syntactic characters, and/or may include undefined tokens (e.g., an ellipse in place of actual code). In these or other embodiments, the code artifacts may have invalid text fragments with respect to the language of interest that are not code snippets of the language of interest. (e.g., natural language text, code of another software language, reports, etc.). In the present disclosure reference to a code artifact may refer to any text that may be related to software code. As such, in some instances a "code artifact" may be or may include a code snippet that may be source code or text written in source code format. Additionally or alternatively text that is not necessarily source code or written in source code format, such as reports or descriptions related to statements or expressions of source code, may also be referred to as a "code artifact" in the present disclosure.

According to one or more embodiments of the present disclosure, a modification module (e.g., of a software development tool) may be configured to analyze a code artifact to identify portions of the code artifact that may be syntactically incongruent with respect to the language of interest. For example, the modification module may be configured to identify and distinguish code snippets of code artifacts from other text related to software code. In these or other embodiments, the modification module may be configured to identify and correct syntactic incongruencies of the identified code snippets such that that the code snippets may be parsable.

The parsable code snippets may then be used in the development of software programs written in the language of interest. For example, repair strategies for a software program in development may be identified from the parsable code snippets. For instance, a particular parsable code snippet may include a repair for a particular bug included in the software program in development. The particular parsable code snippet may be parsed by a software development tool and may be identified, from the parsing, as a repair for the particular bug. The above is merely one example of how the parsable code snippet may be used by a software development tool in debugging (e.g., identifying errors, repairing errors, etc.) of the software program in development.

As such, according to one or more embodiments of the present disclosure, the technological field of software development may be improved by configuring a computer system in a manner in which the computing system is able to modify unparsable code snippets such that they are parsable with respect to a language of interest in which the parsable code snippet may be used to identify bugs and/or repairs in software programs.

Embodiments of the present disclosure are explained with reference to the accompanying drawings.

FIG. 1A is a diagram representing an example environment 100 related to identifying and modifying unparsable code snippets such that they are parsable. The environment 100 may include a modification module 102 configured to analyze an code artifact 104 ("artifact 104"). In these or other embodiments, the artifact 104 may include an unparsable code snippet ("unparsable snippet") that may be identified by the analysis of the artifact 104. Additionally or alternatively, the modification module 102 may be configured to modify the unparsable snippet into a parsable code snippet 106 ("parsable snippet 106").

The artifact 104 may include text that may include portions of code of a software language of interest. For example, the artifact 104 may include code snippets that are portions of source code written in any applicable programming language such as, for example, C++, C, assembly, C#, Java, BASIC, JavaScript, Python, Perl, HTML (HyperText Markup Language), XML (Extensible Markup Language), and SQL (Structured Query Language), among others. In these or other embodiments, the artifact 104 may include text that is invalid with respect to the software language of interest. For example, the artifact 104 may include natural language text, code of another software language, reports regarding tests, etc.

In some embodiments, the artifact 104 may be syntactically incongruent with respect to the language of interest such that the artifact 104 may be unparsable by a software development tool with respect to the language of interest. For example, the artifact 104 may be an unparsable snippet that may be missing syntactic characters (e.g., brackets, semi-colons, etc.), may have extraneous syntactic characters, and/or may include tokens that are not defined for the language of interest ("undefined tokens" e.g., an ellipse in place of actual code). Additionally or alternatively, the artifact 104 may have invalid text fragments with respect to the language of interest (e.g., natural language text, code of another software language, reports regarding tests, etc.) such that the artifact 104 is not a code snippet of the language of interest.

Figure 1B:
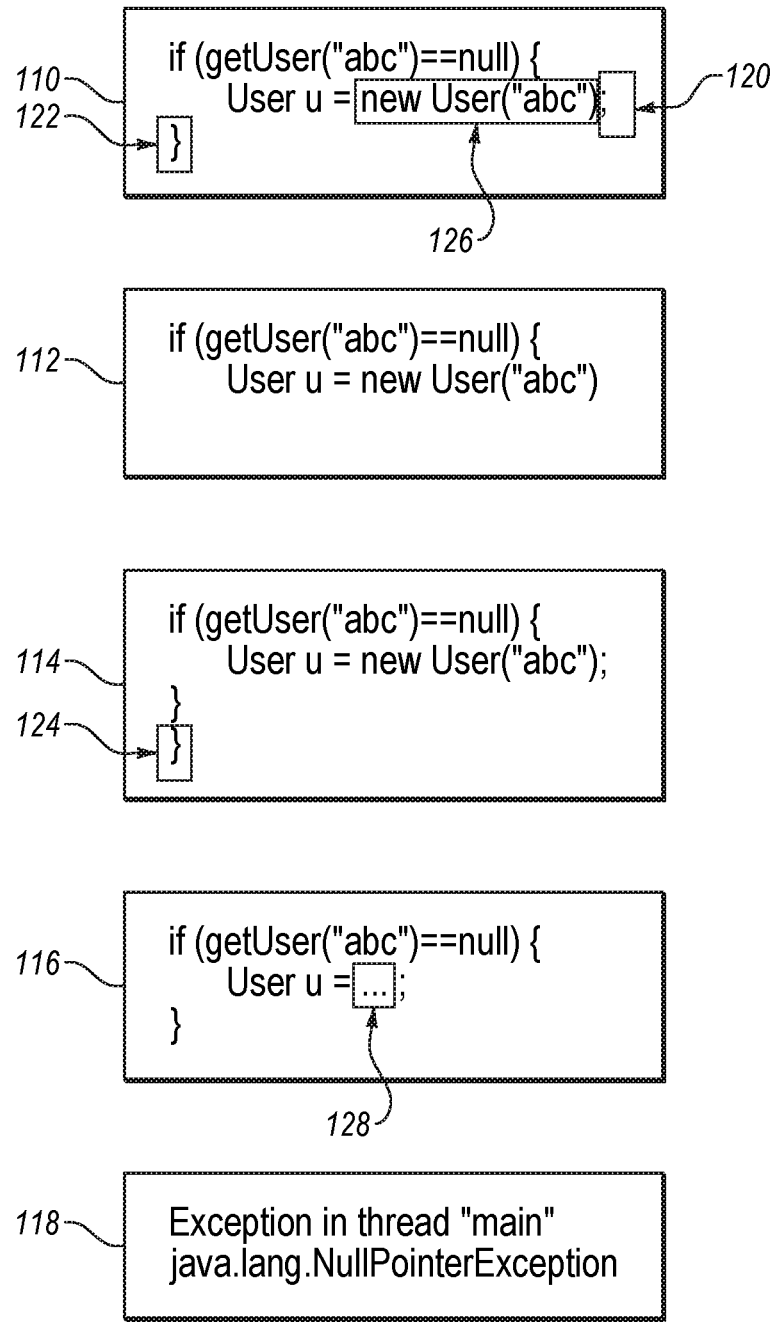
FIG. 1B illustrates various code examples.

By way of example and illustration, FIG. 1B illustrates an example 110 of Java code that is syntactically complete such that example 110 is a parsable Java code snippet. FIG. 1B also illustrates an example 112 of Java code that is missing syntactic characters 120 and 122 of example 110 such that example 112 is syntactically incongruent with respect to Java grammar and is thus an unparsable Java code snippet. As another example, FIG. 1B illustrates an example 114 of Java code that has an additional syntactic character 124 that renders example 114 syntactically incongruent with respect to Java and thus unparsable with respect to Java. As another example, FIG. 1B illustrates an example 116 of Java code in which expression 126 of example 110 has been replaced with an ellipse 128 (" . . . ") such that example 116 is syntactically incongruent with respect to Java and thus unparsable with respect to Java. As another example, FIG. 1B illustrates an example 118 of a code artifact that is a Java error statement and not actual Java code such that example 118 is syntactically incongruent with respect to Java and thus unparsable with respect to Java.

Returning to FIG. 1A, the modification module 102 may include code and routines configured to enable a computing device to perform one or more operations with respect to the artifact 104 to generate the parsable snippet 106. Additionally or alternatively, the modification module 102 may be implemented using hardware including a processor, a microprocessor (e.g., to perform or control performance of one or more operations), a field-programmable gate array (FPGA), or an application-specific integrated circuit (ASIC). In some other instances, the modification module 102 may be implemented using a combination of hardware and software. In the present disclosure, operations described as being performed by the modification module 102 may include operations that the modification module 102 may direct a corresponding system (e.g., a computing system that includes the modification module 102) to perform.

The modification module 102 may be configured to obtain the artifact 104. In some embodiments, the modification module 102 may be configured to obtain the artifact 104 from a repository of code artifacts. For example, the artifact 104 may be included on a software developer forum, which may operate as an informal repository of code artifacts. For instance, members of the forum may post code artifacts (e.g., code snippets, error reports, etc.) as part of discussions regarding software development (e.g., debugging discussions). The code artifacts may often be written as modified source code that may be syntactically incongruent with a language of interest of a particular discussion or may not be of source code of the particular language of interest. As such, in some embodiments, the modification module 102 may be configured to obtain the unparsable snippet 104 from a software development forum. Additionally or alternatively, the discussions of one or more software development forums may be stored in a repository and the modification module 102 may be configured to obtain the artifact 104 from the repository. In these or other embodiments, the artifact 104 may be obtained from any other applicable software documentation source such as API (Application Program Interface) documentation, tutorials, and/or help pages of software development artifacts (e.g., tools, languages, frameworks, etc.).

The modification module 102 may be configured to analyze the artifact 104 to identify portions of the artifact 104 that may be syntactically incongruent with respect to the language of interest. In these or other embodiments, the modification module 102 may be configured to modify the artifact 104 to correct for the syntactic incongruence to generate the parsable snippet 106, which may be parsable with respect to the language of interest. The parsable snippet 106 may be used in the development of software programs in an applicable manner. For example, the parsable snippet 106 may be used to identify and/or repair errors in other software programs that are written in the language of interest.

Additionally or alternatively, the modification module 102 may identify the artifact 104 as corresponding to a software language that is different from the language of interest. In these or other embodiments, rather than generating the parsable snippet 106, the modification module 102 may be configured to annotate the artifact 104 to indicate to which software language the artifact 104 corresponds. In some instances in which the artifact 104 corresponds to another software language different from the software language of interest, the artifact 104 may be unparsable with respect to the software language of interest, but not with respect to the other software language. Additionally or alternatively, the artifact 104 may be of a certain type of report and the modification module 102 may be configured to annotate the artifact 104 to indicate the report type. In some embodiments, the modification module 102 may be configured to analyze and modify the artifact 104 according to one or more operations described below with respect to FIGS. 3-6.

Modifications, additions, or omissions may be made to FIG. 1 without departing from the scope of the present disclosure. For example, the environment 100 may include more or fewer elements than those illustrated and described in the present disclosure.

Figure 2:
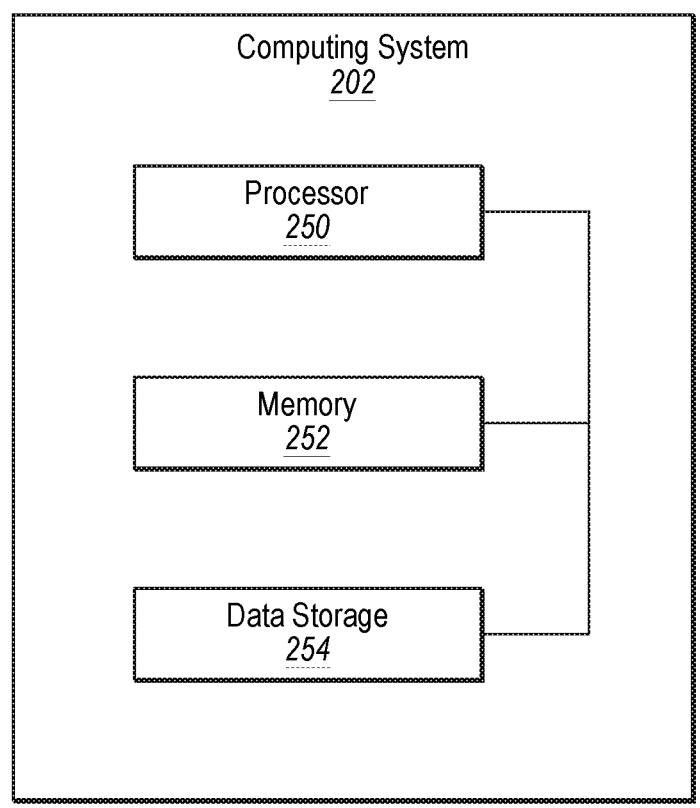
FIG. 2 illustrates a block diagram of an example computing system that may be used to generate a parsable code snippet from an unparsable code snippet.

FIG. 2 illustrates a block diagram of an example computing system 202 that may be used to generate a parsable code snippet from an unparsable code snippet, according to at least one embodiment of the present disclosure. The computing system 202 may be configured to implement or direct one or more operations associated with a modification module (e.g., the modification module 102 of FIG. 1 in some embodiments. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the modification module may be included in the data storage 254 as program instructions. The processor 250 may fetch the program instructions of the modification module from the data storage 254 and may load the program instructions of the modification module in the memory 252. After the program instructions of the modification module are loaded into memory 252, the processor 250 may execute the program instructions such that the computing system may implement the operations associated with the corresponding module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM)or other optical disk storage, magnetic disk storage or other magnetic storage devices, flash memory devices (e.g., solid state memory devices), or any other storage medium which may be used to store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
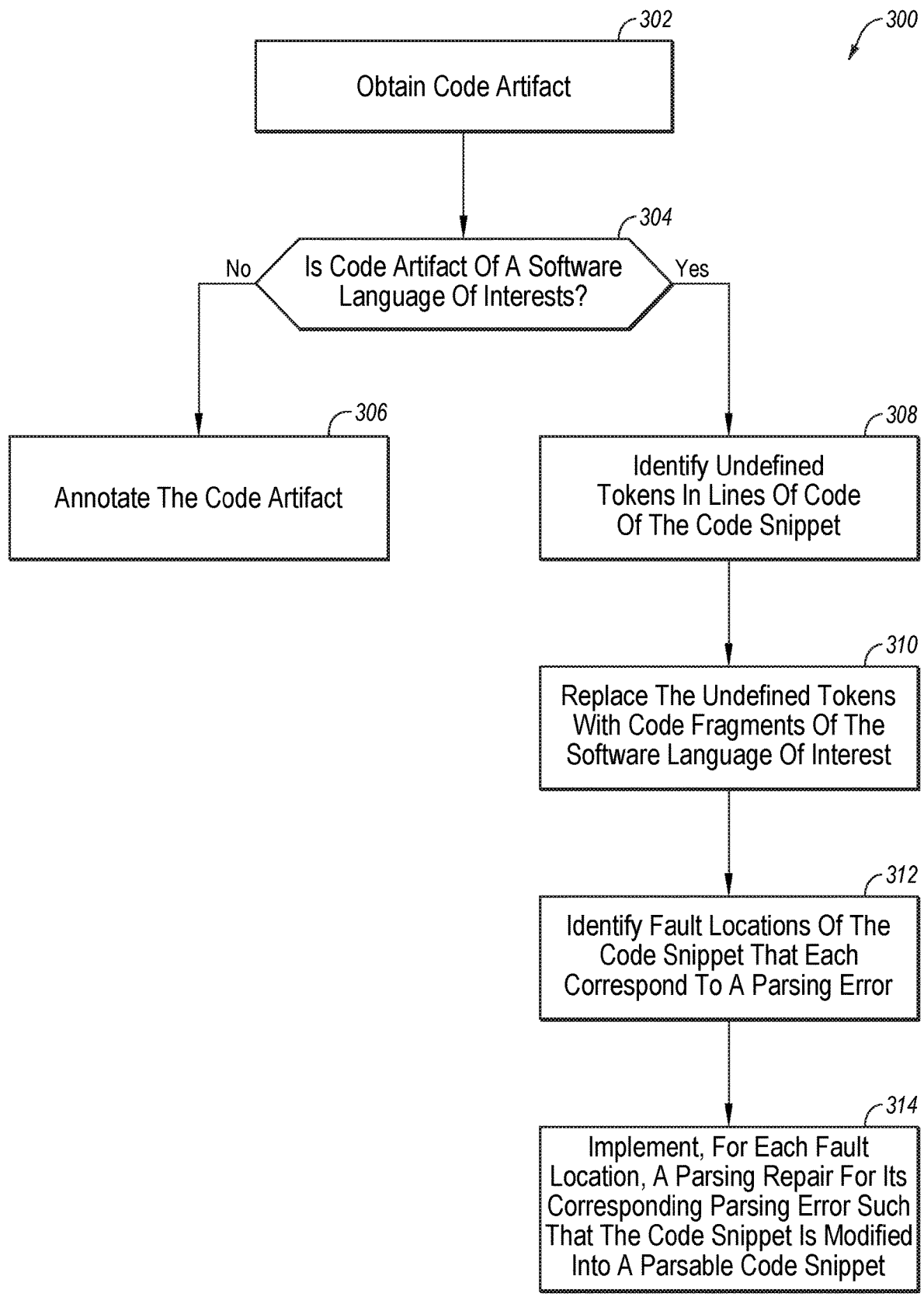
FIG. 3 is a flowchart of an example method of generating a parsable code snippet from an unparsable code snippet.

FIG. 3 is a flowchart of an example method 300 of generating a parsable code snippet from a code artifact, according to at least one embodiment described in the present disclosure. The method 300 may be performed by any suitable system, apparatus, or device with respect to code under test. For example, the modification module 102 of FIG. 1A, or the computing system 202 of FIG. 2 (e.g., as directed by the modification module) may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 302, a code artifact may be obtained. In some embodiments, the code artifact may be unparsable with respect to a particular software language. In these or other embodiments, the code artifact may be listed on a software development forum. Additionally or alternatively, the code artifact may be obtained from the software development forum or some other repository of code artifacts.

At block 304, it may be determined whether the code artifact is of a particular software language that may be of interest. In some embodiments, the determination may be made based on whether the code artifact conforms to a grammar of the particular software language. In some embodiments, the determination as to whether the code artifact conforms to the grammar may be based on an elimination based inference. For instance, it may be determined whether the code artifact is formatted according to another software language format, a report (e.g., error report, runtime report, output report, stacktrace report, log report, etc.) format, etc. In these or other embodiments, in response to determining that the code snippet is not formatted according to another software language format, a report format, etc., it may be determined that the code snippet is of the particular software language. In some embodiments, the elimination based inference may be performed according to one or more operations described below with respect to FIG. 4.

In some embodiments, in response to determining that the code artifact is not of the particular software language, the code artifact may be annotated at block 306. In these or other embodiments, the annotation may indicate to what the code artifact may relate. For example, the annotation may indicate a type of report or software language of the code artifact.

Returning to block 304, in response to determining that the code artifact is of the particular software language, it may be determined that the code artifact is a code snippet of the particular software language and the method 300 may proceed to block 308. At block 308, one or more undefined tokens may be identified in one or more lines of the code snippet. In some embodiments, the identification of undefined tokens may be based on a grammar that may be written to identify such tokens. For example, the grammar may be written to include one or more regular expressions that may be used to search the code snippet for the undefined tokens. In these or other embodiments, the identification of undefined tokens may be performed by determining whether each line of code matches a generated statement or expression regular expression. In some embodiments, the identification of the undefined tokens may be performed according to one or more operations described below with respect to FIG. 5.

At block 310, the identified undefined tokens may be replaced with a parsable code fragment. For example, an identified undefined token that may be replaced with a dummy statement or dummy expression of the particular language of interest. In some embodiments, the dummy code fragment may be encoded with a reference to the undefined token, which may be used to identify the location of the undefined token as part of repairing the code snippet to make it parsable. In some embodiments, the replacement of undefined tokens may be performed according to one or more operations described below with respect to FIG. 5.

At block 312, fault locations of the code snippet that each correspond to a parsing error may be identified. In some embodiments, one or more of the fault locations may be portions of the code snippet that failed a grammar rule of the particular language of interest such that the corresponding fault locations may be syntactically incongruent (e.g., have a syntax error) with the particular language of interest. In these or other embodiments, one or more of the fault locations may be a line of code that has an undefined token replaced, such as described with respect to block 310.

In some embodiments, the identification of fault locations may include building a parse tree of the code snippet in which the parse tree represents syntactic relationships of elements of the code snippet. In these or other embodiments, the parse tree may include error nodes that indicate portions of the code snippet that result in parsing errors. The error nodes may accordingly indicate the fault locations of the code snippet such that the error nodes may be used to identify the fault locations.

At block 314, a parsing repair may be implemented at each fault location. The parsing repairs may be modifications made to the fault locations to correct the parsing error that corresponds to each respective fault location. The modifications may be such that the code snippet may be parsable.

In some embodiments, the repairs may be identified based on an error type of the parsing errors of the fault locations. For example, in some embodiments, one or more of the repairs may be based on whether the fault location corresponds to a dummy code fragment that replaces an undefined token or a failed grammar rule. In these or other embodiments, one or more of the repairs may be based on the type of dummy code fragment or the type of failed grammar rule. Additionally or alternatively, the repairs may be selected and identified from a precompiled library of specialized repair templates. In these or other embodiments, one or more of the repairs may be identified from the repair templates based on a parent node type of parent nodes of the error nodes of the parse tree. In some embodiments, the identification of the fault locations, the corresponding errors and error types, and identification and implementation of the corresponding repairs may be performed according to one or more operations described below with respect to FIG. 6.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks or fewer blocks.

Figure 4:
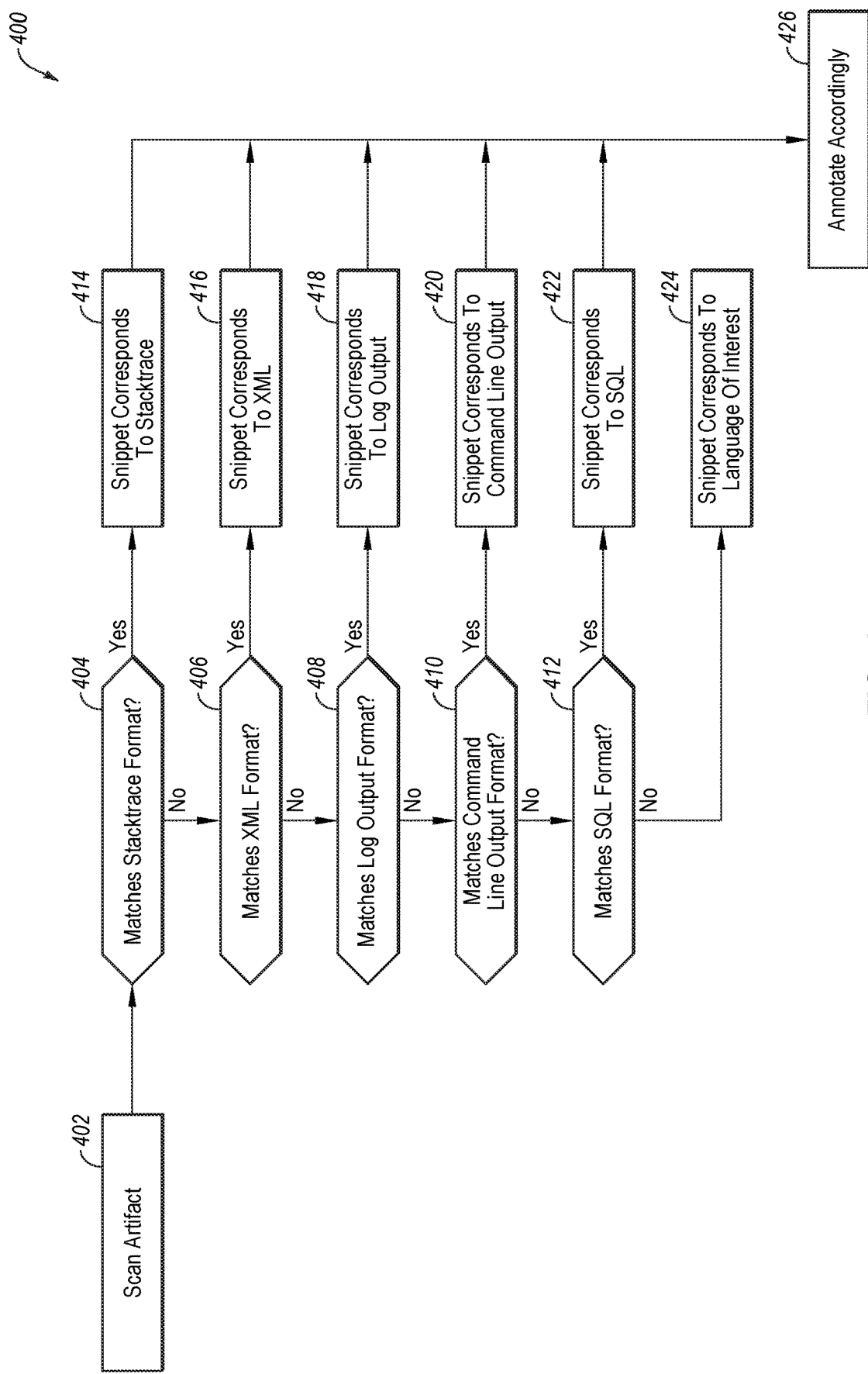
FIG. 4 is a flowchart of an example method of performing an elimination based inference with respect to whether a particular code snippet corresponds to a particular software language of interest.

FIG. 4 is a flowchart of an example method 400 of performing an elimination based inference with respect to whether a particular code artifact corresponds to a particular software language of interest, according to at least one embodiment described in the present disclosure. The method 400 may be performed by any suitable system, apparatus, or device with respect to code under test. For example, the modification module 102 of FIG. 1A, or the computing system 202 of FIG. 2 (e.g., as directed by the modification module) may perform one or more of the operations associated with the method 400. Further, as indicated above, in some embodiments, one or more of the operations of the method 400 may be performed as part of operations 304 and 306 of the method 300 of FIG. 3. Although illustrated with discrete blocks, the steps and operations associated with one or more of the blocks of the method 400 may be divided into additional blocks, combined into fewer blocks, or eliminated, depending on the particular implementation.

The method 400 in general may be used with respect to code artifacts that are selected from a discussion on a developer forum in which the discussion is related to the particular software language of interest. As such, the method 400 may be used to determine whether the particular code artifact is formatted according to another software language format or a report format, and in response to determining that the particular code artifact is not formatted according to another software language format or a report format, it may be determined that the particular code artifact includes code of the particular software language of interest and is thus a code snippet of the particular software language of interest. In the present example, the particular software language of interest may be Java and the other software languages and the reports may include a stacktrace report, XML, a log output report, a command line output report, and SQL. The other software languages and reports that may be part of the inference may vary depending on the particular software language of interest and may be determined based on a heuristic analysis as to which other software languages and which reports may be included in discussions related to the particular software language of interest.

At block 402, the particular code artifact may be scanned. The scanning may be used to identify characters (e.g., words, grammatical symbols, etc.) included in the particular code artifact as well as the arrangement of the characters with respect to each other.

At block 404, using the identified characters and arrangement, it may be determined whether the particular code artifact matches the format of a stacktrace report. For example, it may be determined whether one or more of the characters of the particular code snippet are those that are uniquely associated with a stacktrace report. In these or other embodiments, it may be determined whether one or more arrangements of the characters with respect to each other are uniquely associated with a stacktrace report. In some embodiments, the determinations may be made by determining whether one or more of the characters and/or arrangements match a regular expression (e.g., a specific sequence of characters) that uniquely corresponds to stacktrace reports.

In response to one or more characters and/or arrangements of characters matching the format of a stacktrace report, the method 400 may proceed from block 404 to block 414. At block 414 it may be determined that the particular code artifact corresponds to a stacktrace report. The method 400 may proceed from block 414 to block 426 where the particular code artifact may be annotated as corresponding to a stacktrace report.

Returning to block 404, in response to no characters and/or arrangements of characters matching the format of a stacktrace report, the method 400 may proceed from block 404 to block 406. At block 406, using the identified characters and arrangement, it may be determined whether the particular code artifact matches the format of XML code. For example, it may be determined whether one or more of the characters of the particular code artifact are those that are uniquely associated with XML code. In these or other embodiments, it may be determined whether one or more arrangements of the characters with respect to each other are uniquely associated with XML code. In some embodiments, the determinations may be made by determining whether one or more of the characters and/or arrangements match a regular expression that uniquely corresponds to XML code.

In response to one or more characters and/or arrangements of characters matching the format of XML code, the method 400 may proceed from block 406 to block 416. At block 416 it may be determined that the particular code artifact corresponds to XML code. The method 400 may proceed from block 416 to block 426 where the particular code artifact may be annotated as corresponding to XML code.

Returning to block 406, in response to no characters and/or arrangements of characters matching the format of XML code, the method 400 may proceed from block 406 to block 408. At block 408, using the identified characters and arrangement, it may be determined whether the particular code artifact matches the format of an output log. For example, it may be determined whether one or more of the characters of the particular code artifact are those that are uniquely associated with output log reports. In these or other embodiments, it may be determined whether one or more arrangements of the characters with respect to each other are uniquely associated with output logs. In some embodiments, the determinations may be made by determining whether one or more of the characters and/or arrangements match a regular expression that uniquely corresponds to output logs.

In response to one or more characters and/or arrangements of characters matching the format of output logs, the method 400 may proceed from block 408 to block 418. At block 418 it may be determined that the particular code artifact corresponds to an output log report. The method 400 may proceed from block 418 to block 426 where the particular code artifact may be annotated as corresponding to an output log report.

Returning to block 408, in response to no characters and/or arrangements of characters matching the format of an output log report, the method 400 may proceed from block 408 to block 410. At block 410, using the identified characters and arrangement, it may be determined whether the particular code artifact matches the format of a command line output. For example, it may be determined whether one or more of the characters of the particular code artifact are those that are uniquely associated with command line outputs. In these or other embodiments, it may be determined whether one or more arrangements of the characters with respect to each other are uniquely associated with command line outputs. In some embodiments, the determinations may be made by determining whether one or more of the characters and/or arrangements match a regular expression that uniquely corresponds to command line outputs.

In response to one or more characters and/or arrangements of characters matching the format of command line outputs, the method 400 may proceed from block 410 to block 420. At block 420 it may be determined that the particular code artifact corresponds to a command line output. The method 400 may proceed from block 420 to block 426 where the particular code artifact may be annotated as corresponding to a command line output.

Returning to block 410, in response to no characters and/or arrangements of characters matching the format of a command line output, the method 400 may proceed from block 410 to block 412. At block 412, using the identified characters and arrangement, it may be determined whether the particular code artifact matches the format of SQL code. For example, it may be determined whether one or more of the characters of the particular code artifact are those that are uniquely associated with SQL code. In these or other embodiments, it may be determined whether one or more arrangements of the characters with respect to each other are uniquely associated with SQL code. In some embodiments, the determinations may be made by determining whether one or more of the characters and/or arrangements match a regular expression that uniquely corresponds to SQL code.

In response to one or more characters and/or arrangements of characters matching the format of SQL code, the method 400 may proceed from block 412 to block 422. At block 422 it may be determined that the particular code artifact corresponds to SQL code. The method 400 may proceed from block 422 to block 426 where the particular code artifact may be annotated as corresponding to SQL code.

Returning to block 412, in response to no characters and/or arrangements of characters matching the format of SQL code, the method 400 may proceed from block 412 to block 424. At block 424 it may be determined that the particular code artifact is a code snippet that corresponds to the particular software language of interest (e.g., Java in this particular example). In some embodiments, this determination may be made because the other possible software languages and reports have been ruled out. In some embodiments, in response to the determination at block 424, the method 300 of FIG. 3 may proceed from block 304 to block 308.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks or fewer blocks. For example, the determinations made with respect to specific languages and reports are merely given as examples and the number, order, and/or types of determinations in making the elimination based inference may vary.

Figure 5:
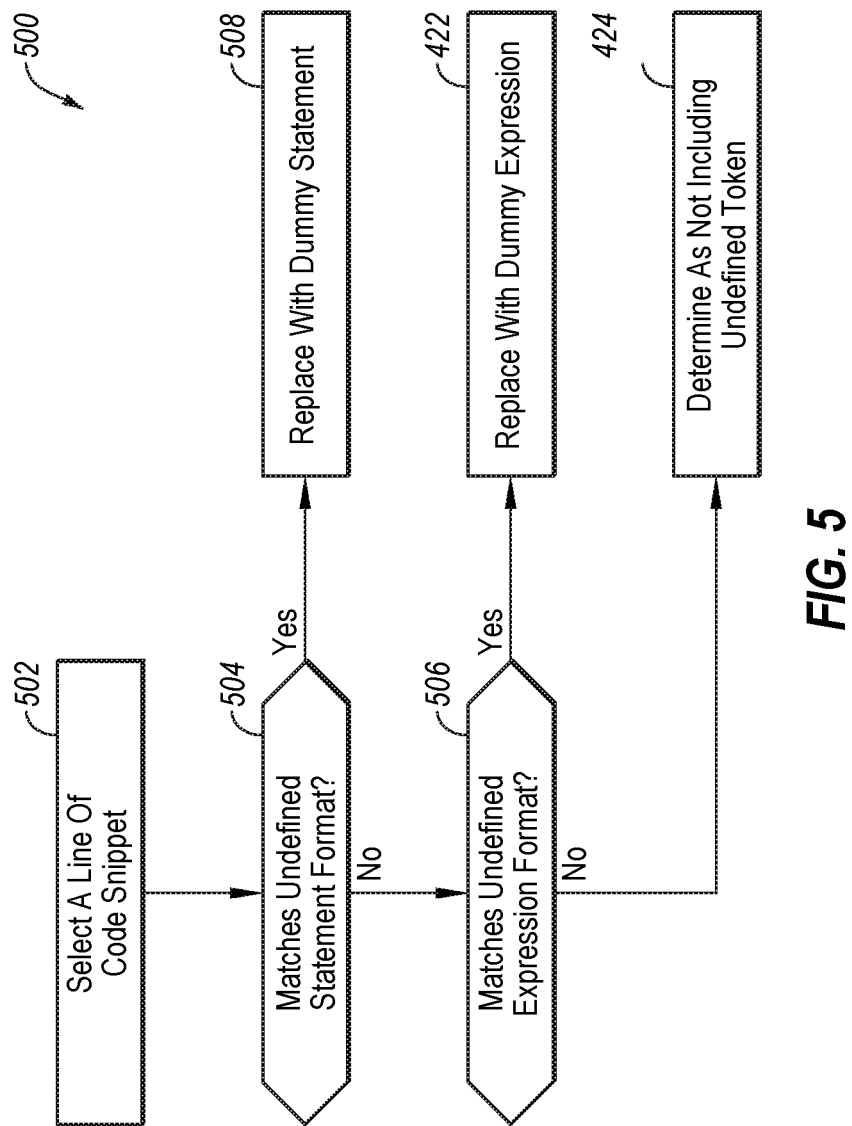
FIG. 5 is a flowchart of an example method of identifying undefined tokens in a particular code snippet.

FIG. 5 is a flowchart of an example method 500 of identifying undefined tokens in a particular code snippet, according to at least one embodiment described in the present disclosure. The method 500 may be performed by any suitable system, apparatus, or device with respect to code under test. For example, the modification module 102 of FIG. 1A, or the computing system 202 of FIG. 2 (e.g., as directed by the modification module) may perform one or more of the operations associated with the method 500. Further, as indicated above, in some embodiments, one or more of the operations of the method 500 may be performed as part of operations 308 and 310 of the method 300 of FIG. 3 after it has been determined that the particular code artifact is the particular code snippet that corresponds to a particular software language of interest. Although illustrated with discrete blocks, the steps and operations associated with one or more of the blocks of the method 500 may be divided into additional blocks, combined into fewer blocks, or eliminated, depending on the particular implementation.

In general, the method 500 may be configured to identify undefined tokens by determining whether each line of code of the particular code snippet matches an undefined statement or undefined expression format as described in further detail below. The term "undefined statement" as used in the present disclosure may refer to undefined characters of the particular code snippet that are substitutes for standalone statements in the particular code snippet. The term "undefined expression" as used in the present disclosure may refer to characters of the particular code snippet that are embedded in a statement as a substitute for expressions of the statement.

At block 502, a particular line of code of the particular code snippet may be selected and scanned. The scanning may be used to identify characters (e.g., words, grammatical symbols, etc.) included in the particular line of code as well as the arrangement of the characters with respect to each other.

At block 504, using the identified characters and arrangement, it may be determined whether the particular code snippet matches the format of undefined statements of the particular software language of interest. For example, it may be determined whether one or more of the characters of the particular code snippet are those that are associated with undefined statements of the particular software language of interest. In these or other embodiments, it may be determined whether one or more arrangements of the characters with respect to each other are uniquely associated with undefined statements of the particular software language of interest. In some embodiments, the determinations may be made by determining whether one or more of the characters and/or arrangements match a regular expression that uniquely corresponds to undefined statements of the particular software language of interest. For example, sequences of periods ("."), asterisks ("*"), or backquotes (" "), are often used in place of statements of Java code in which such character sequences are undefined with respect to Java. As such, regular expressions that correspond to such sequences as used in place of statements may be used to determine whether the particular line of code includes an undefined Java statement. For instance, it may be determined whether one or more of the following regular expressions corresponds to the particular line of code "^*[\[\(<{]?([\•\*'])\1+[\]\)>}]?*$","^*([\•\*'])\1+", and "([\•*\'])\1+*$".

The regular expression "^*[\[\(<{]?([\•\*'])\1+[\]\)>}]?*$" checks whether a line only contains the consecutive sequence of dots (.), asterisks (*), or backquotes ('). Moreover, this regular expression checks whether the sequence is enclosed in different kinds of brackets, such as parentheses ( ), braces { }, square brackets [ ], and angular brackets < >.

The regular expression "^*([\•\*'])\1+" checks whether the consecutive sequence of dots (.), asterisks (*), or backquotes (') is at the start of a line followed by other valid characters. The regular expression, "([\•\*'])\1+*$". checks whether the consecutive sequence is at the end of the line with preceding valid characters In response to one or more characters and/or arrangements of characters matching the undefined statement format of the particular software language of interest, it may be determined that the particular line of code includes an undefined token in place of a valid statement and the method 500 may proceed from block 504 to block 508. At block 508, the undefined token may be replaced with a dummy statement. The dummy statement may include any suitable statement that may be syntactically correct with respect to the particular code of interest and that may encode a reference to the corresponding undefined token. For example, the undefined token may be replaced with a dummy variable declaration, method call, or variable initialization. For instance, for an undefined token of " . . . " the dummy variable declaration statement may be as follows: "Object UNREC_TOKENS_STATEMENT_46_46_46" in which the "46" is a reference to the dots "." of the undefined token because the ASCII code for a dot "." is "46." Similarly, a dummy method call for the undefined token " . . . " may be as follows: "UNREC_TOKENS_STATEMENT_46_46_46( );". Additionally, a dummy variable initialization for the undefined token " . . . " may be as follows: "String s=UNREC_TOKENS_STATEMENT_46_46_46;".

Returning to block 504, in response to no characters and/or arrangements of characters matching the undefined statement format, the method 500 may proceed from block 504 to block 506. At block 506, using the identified characters and arrangement, it may be determined whether the particular code snippet matches the format of undefined expressions of the particular software language of interest. For example, it may be determined whether one or more of the characters of the particular code snippet are those that are associated with undefined expressions of the particular software language of interest. In these or other embodiments, it may be determined whether one or more arrangements of the characters with respect to each other are uniquely associated with undefined expressions of the particular software language of interest. In some embodiments, the determinations may be made by determining whether one or more of the characters and/or arrangements match a regular expression that uniquely corresponds to undefined expressions of the particular software language of interest. For example, sequences of periods ("."), asterisks ("*"), or backquotes (" "), are often used in place of expressions of Java code. As such, regular expressions that correspond to such sequences as used in place of Java expressions may be used to determine whether the particular line of code includes an undefined Java expression. For instance, it may be determined whether the following regular expressions corresponds to the particular line of code "([\•\*'])\1+". The regular expression "([\•\*'])\1+" may check for sequences of periods ("."), asterisks ("*"), or backquotes but without restrictions related to the start or end of a line due to the regular expression "([\•\*'])\1+" corresponding to undefined expressions instead of undefined statements.

In response to one or more characters and/or arrangements of characters matching the undefined expression format, it may be determined that the particular line of code includes an undefined token in place of a valid expression and the method 500 may proceed from block 506 to block 510. At block 510, the undefined token may be replaced with a dummy expression. The dummy expression may include any suitable expression that may be syntactically correct with respect to the particular code of interest and that may encode a reference to the corresponding undefined token, such as described above.

Returning to block 506, in response to no characters and/or arrangements of characters matching the undefined expression format of the particular software language of interest, the method 500 may proceed from block 506 to block 512. At block 512 it may be determined that the particular line of code does not include an undefined token. In some embodiments, this determination may be made because the particular line of code likely does not include an undefined token if it is not of the statement or expression format.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 500 may include additional blocks or fewer blocks. For example, in some embodiments, the operations of the method 500 may be repeated until every line of the particular code snippet has been analyzed for undefined tokens.

FIG. 6 is a flowchart of an example method 600 of identifying and repairing parsing errors in a particular code snippet, according to at least one embodiment described in the present disclosure. The method 600 may be performed by any suitable system, apparatus, or device with respect to code under test. For example, the modification module 102 of FIG. 1A, or the computing system 202 of FIG. 2 (e.g., as directed by the modification module) may perform one or more of the operations associated with the method 600. Further, as indicated above, in some embodiments, one or more of the operations of the method 600 may be performed as part of operations 312 and 314 of the method 300 of FIG. 3. Although illustrated with discrete blocks, the steps and operations associated with one or more of the blocks of the method 600 may be divided into additional blocks, combined into fewer blocks, or eliminated, depending on the particular implementation.

At block 602, a parse tree of the particular code snippet may be built. The parse tree may include an ordered tree structure that may represent the syntactic structure of the particular code snippet with respect to the grammar of the software language of the particular code snippet. The syntactic structure may represent syntactic relationships of the elements (e.g., characters, tokens, objects (e.g., classes, variables, methods, functions, etc.), etc.) included in the particular code snippet.

In some embodiments, the parse tree may include nodes that correspond to different elements of the particular code snippet. The nodes may be organized in a hierarchal manner that includes parent nodes and one or more children nodes of the parent nodes in which the children nodes correspond to sub-elements of the elements that correspond to the parent nodes. For example, a particular parent node may correspond to a function that includes a particular variable and a corresponding child node may correspond to the particular variable.

In these or other embodiments, one or more nodes of the parse tree may be identified as error nodes. The error nodes may be nodes that correspond to portions of the particular code snippet that are syntactically incongruent (e.g., have a syntax error, undefined token, etc.) with the software language of the particular code snippet (also referred to as fault locations of the particular code snippet) and that may be indicated as such in the parse tree. In the present disclosure, the building of the parse tree may identify as error nodes those locations of the code snippet that correspond to a dummy code fragment and those that have one or more syntax errors. In these or other embodiments, the references included in the dummy code fragments may be used to identify the corresponding nodes as error nodes.

At block 604, an error node (e) of the parse tree may be identified. As indicated above, the error node may correspond to a particular fault location of the particular code snippet.

In some embodiments, a type of the error node may also be identified. In some embodiments, the error nodes may be categorized as a first type (T1) of error node that corresponds to a dummy code fragment (e.g., dummy statement or dummy expression) that may be inserted in the particular code snippet such as described above with respect to FIG. 5. Additionally or alternatively, the error nodes may be categorized as a second type (T2) of error node that corresponds to a portion of the particular code snippet that failed one or more grammar rules of the software language of the particular code snippet. Accordingly, in some embodiments, the error node may be identified as type T1 or type T2 at block 604 depending on whether or not it includes a dummy code fragment or fails one or more grammar rules.

In these or other embodiments, the error node type may include a type of portion of the particular code snippet that corresponds to the error node. For example, the portion may correspond to a "try" block, a "catch" block, an "else" block, a dummy statement, a dummy expression, etc. In some embodiments, the error node may also be identified as having one of these types in addition to being of type T1 or T2.

At block 606, the parent node (p) of e may be identified. In these or other embodiments, a type of the parent node p may also be identified. The type of the parent node may correspond to the type of element of the particular code snippet to which the parent node p may correspond. For example, the different types of elements may be a variable declaration or assignment, an "if" block, a "while" block, an argument, a class, a function, a method, a type declaration, an "or" block, a statement as described above, an expression as described above, a code block, etc. Accordingly, in some embodiments, the parent node p may be identified as having a type that corresponds to the type of its corresponding element. In some embodiments the error node may not have a parent node such that the operations of block 606 may be omitted.

At block 608, a set of candidate fixes (F) may be identified. In some embodiments, the set of candidate fixes may be identified based on the type of the error node. In these or other embodiments, the set of candidate fixes may also be identified based on the type of the parent node. The set of candidate fixes may include one or more repairs that may be of a certain type that may be used to repair the parsing error at the fault location that corresponds to the error node. In some embodiments, the set of candidate fixes may be obtained from a library of repair templates that has been compiled. The repair templates may include specialized repairs for the different types of error nodes and their corresponding parent nodes.

Figure 6A:
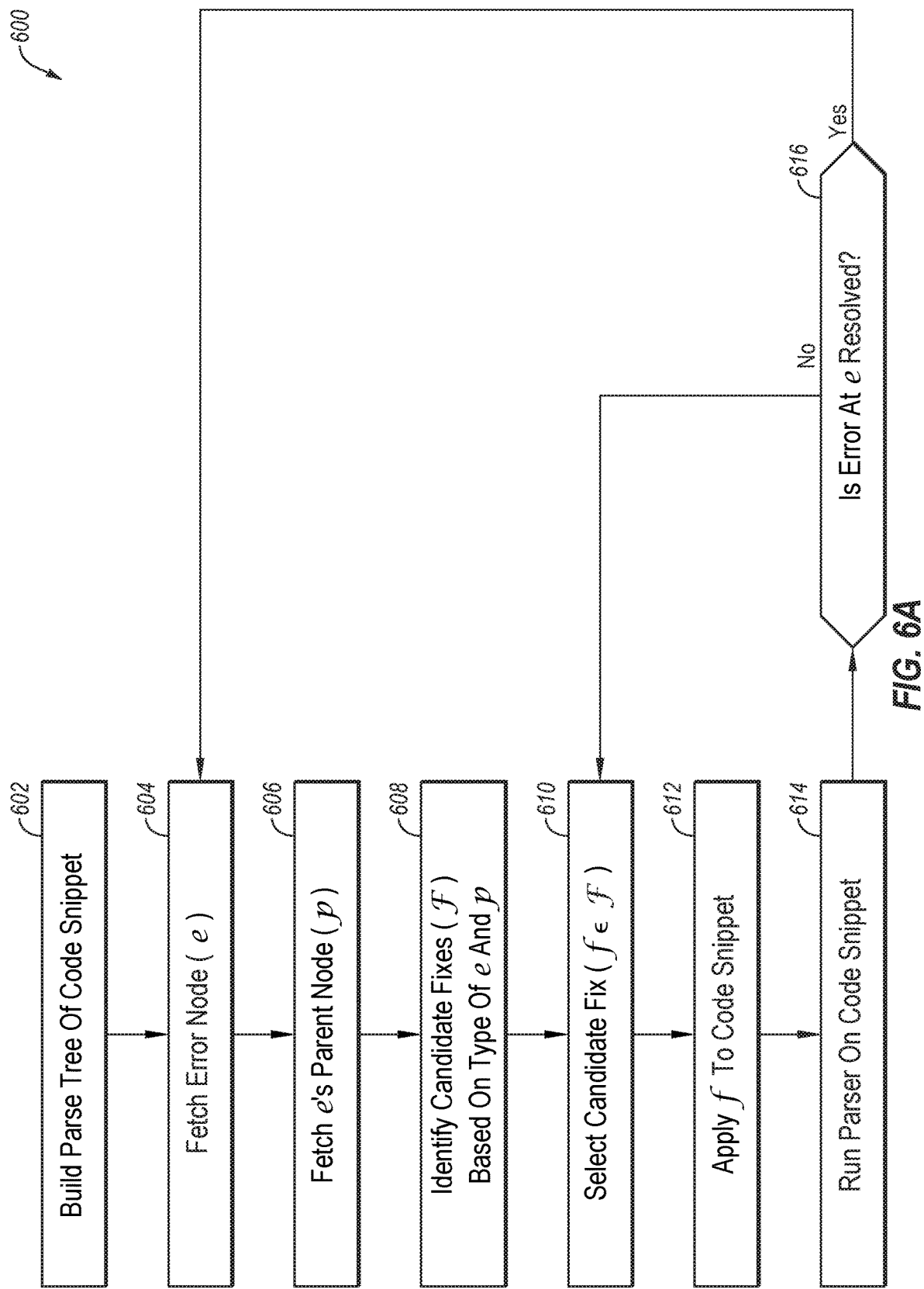
FIG. 6A is a flowchart of an example method of identifying and repairing parsing errors in a particular code snippet.
Figure 6B:
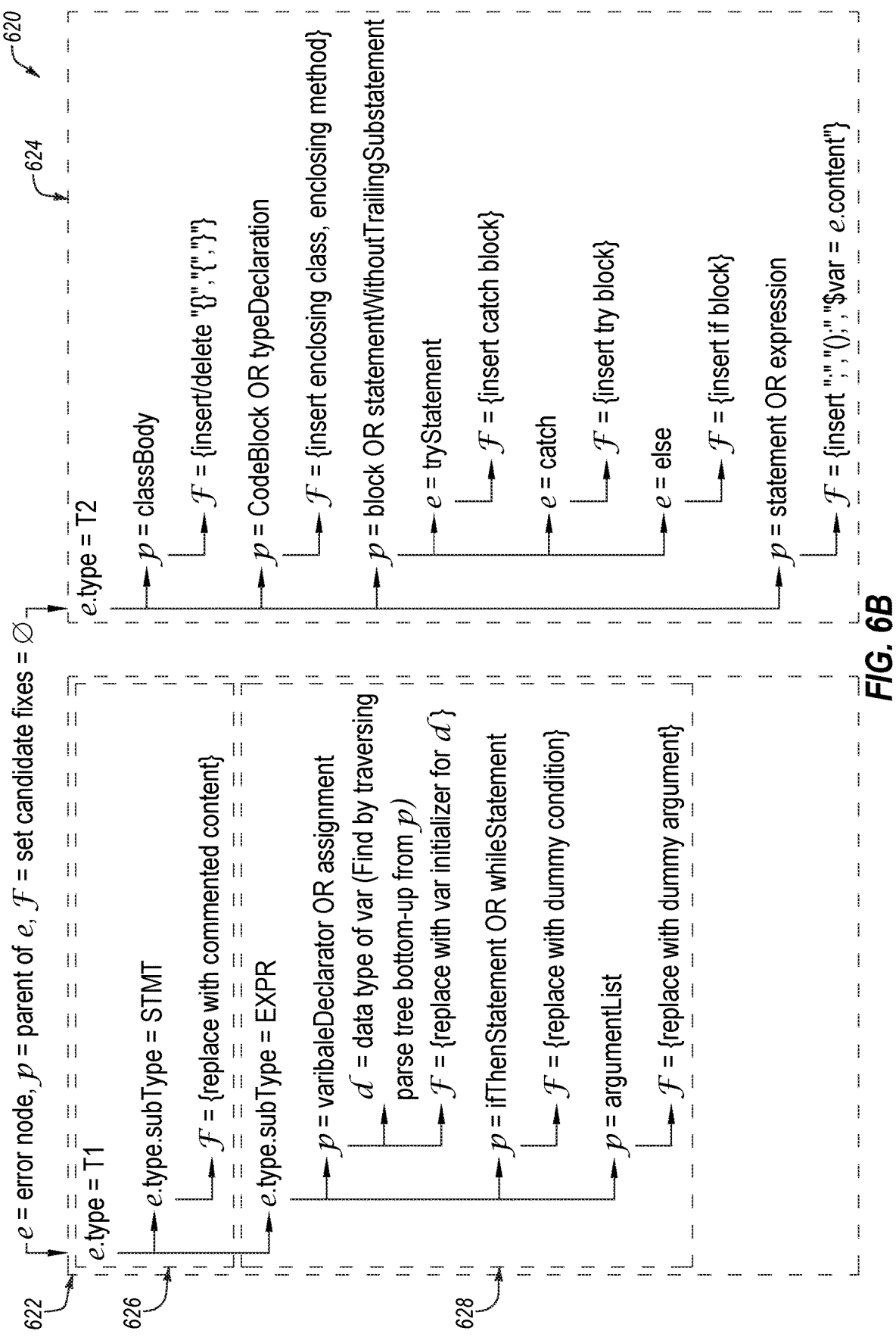
FIG. 6B illustrates an example repair template that may be used to repair parsing errors.

For example, FIG. 6B illustrates an example repair template 620 that may be used to repair parsing errors. FIG. 6B is not meant to be limiting as to the different repair templates that may be used and is based on some common parsing errors and potential repairs. However, the repair template may be expanded, contracted, or otherwise modified.

In the particular example of FIG. 6B, the repair template 620 may include a first operations path 622 ("first path 622") and a second operations path 624 ("second path 624"). The first path 622 may relate to instances in which the error node is of type T (corresponds to a dummy code fragment) and the second path 624 may relate to instances in which the error node is of type T2 (corresponds to a failed grammar rule).

In path 622 (e.g., instances in which the error node is of type T1), it may be determined whether the dummy code fragment is a dummy statement or a dummy expression. In response to the dummy code fragment being a dummy statement, repair operations 626 may be performed. In repair operations 626, the set of candidate fixes that may be selected may include replacing the dummy statement with commented content. For example, the original undefined token of the dummy statement may be inserted but in a commented manner such that it is syntactically valid. In some embodiments, the original undefined token may be encoded in the dummy statement and may be decoded.

In response to the dummy code fragment being a dummy expression, repair operations 628 may be performed. In repair operations 628, the parent node type may be used to select the set of candidate fixes.

For example, in response to the parent node type being a variable declaration or assignment, the set of candidate fixes may include different variable initializers that may be used for the corresponding variable. In these or other embodiments, the different variable initializers may correspond to a certain type of the corresponding variable. The type of the corresponding variable may be identified by traversing the parse tree bottom up from the parent node in some embodiments. For example, this repair action may be used to synthesize a valid variable initialization in the declaration of that variable. Additionally, the grammar for variable declaration is:

type var_name=initialization_expression;

Of these, at the current fault location in the parse tree, the var_name may be known and the objective may be to generate initialization_expression. However, to generate that expression accurately the type of that variable (var_name) may need to be known This information may be present in the parse tree, but at some location above the current node. Hence, the up-traversal may be performed to find that type node in the parse tree.

As another example, in response to the parent node type being an "if" statement or a "while" statement, the set of candidate fixes may include different dummy conditions that may be applied to the "if" statement or the "while" statement. As another example, in response to the parent node type being an argument list, the set of candidate fixes may include dummy arguments.

In path 624 (e.g., instances in which the error node is of type T2 (corresponds to a failed grammar rule)), the parent node type may also be used to select the set of candidate fixes. For example, in response to the parent node being of a "class" type, the set of candidate fixes may include the insertion or deletion of syntactic characters such as "{ }", "{", or "}" characters. As another example, in response to the parent node type being a code block or a type declaration, the set of candidate fixes may include inserting an enclosing class or an enclosing method. As another example, in response to the parent node type being a block "or" statement without a trailing substatement, the set of candidate fixes may be based on a type of the portion of the particular code snippet that corresponds to the error node. For example, in response to the error node corresponding to a "try" block, the set of candidate fixes may include "catch" blocks of code that may be inserted at the corresponding fault location. As another example, in response to the error node corresponding to a "catch" block, the set of candidate fixes may include "try" blocks of code that may be inserted at the corresponding fault location. As another example, in response to the error node corresponding to an "else" block, the set of candidate fixes may include "if" blocks that may be inserted at the corresponding fault location. As another example, in response to the parent node type being a statement or expression, the set of candidate fixes may include insertion of syntactic characters such as ";", "{ };", or "$var=e.content", in which "e.content" refers to encoded content Returning to FIG. 6A, at block 610, a candidate fix "f" may be selected from the set of candidate fixes "F" that is identified at block 608. At block 612, the selected candidate fix may be applied to the fault location of the particular code snippet that corresponds to the error node.

At block 614, a parser may be run with respect to the particular code snippet. The running of the parser may indicate whether the parsing error at the fault location that corresponds to the error node has been repaired. At block 616, it may be determined whether the parsing error has been repaired. In response to the parsing error not being repaired, the method 600 may return to block 610 from block 616 where another candidate fix may be selected from the set of candidate fixes.

In response to the error being repaired, the method 600 may return to block 604 where another error node may be identified. In some embodiments, the method 600 may be performed until every fault location has been repaired. In these or other embodiments, the particular code snippet may accordingly be modified into a parsable code snippet. Additionally or alternatively, the method 600 may be performed until a certain number of repair attempts have been performed.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 600 may include additional blocks or fewer blocks. Additionally, the types of repair operations that are described are examples and not an exhaustive list of all the repair operations that may be performed.

Figure 7A:
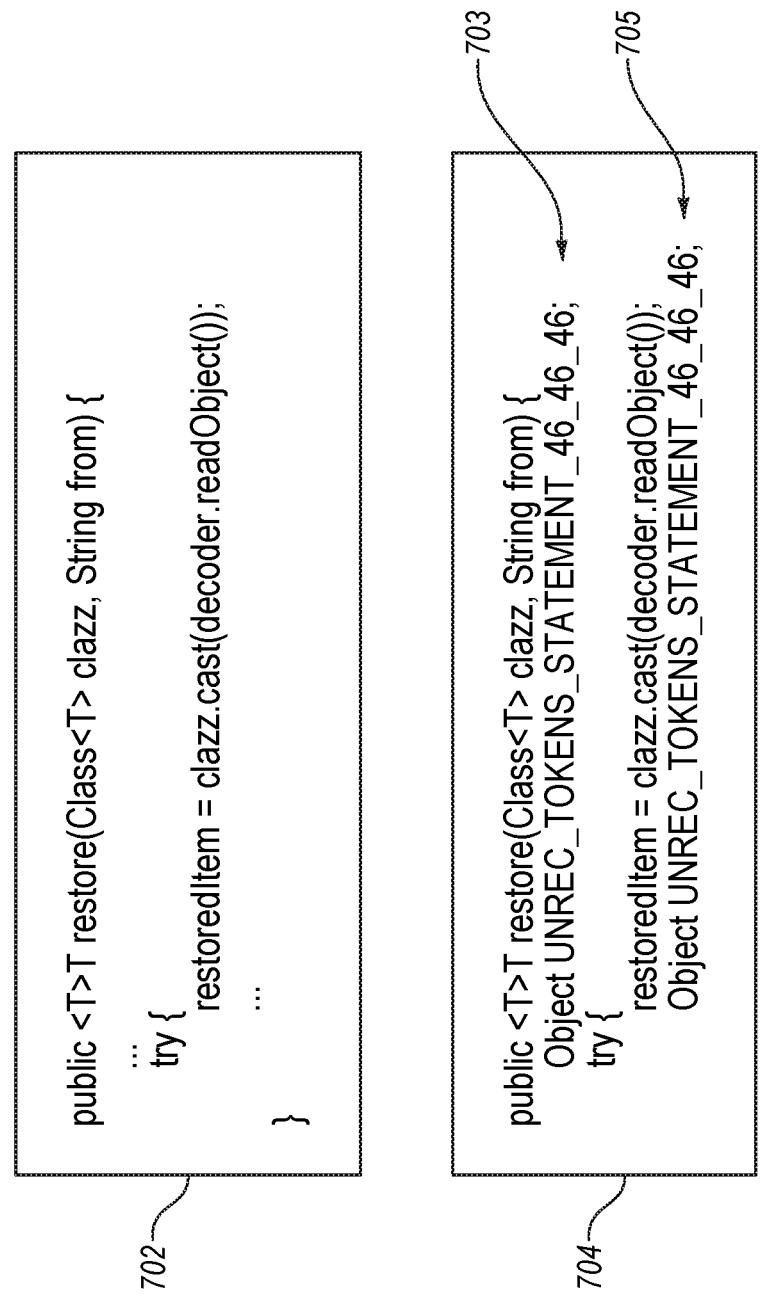
FIGS. 7A-7F illustrate an example of how methods 300, 400, 500, and 600 may be applied to an example code snippet.

FIGS. 7A-7F illustrate an example of how one or more operations of one or more of the methods 300, 400, 500, and 600 may be applied to an example code artifact 702 ("artifact 702") of FIG. 7A, according to one or more embodiments of the present disclosure. For instance, the artifact 702 may be a code snippet of Java code and may be obtained from a Java discussion board. The artifact 702 may include five parsing errors that may make it unparsable. The parsing errors may include a missing enclosing class, two undefined tokens (" . . . "), a missing closing bracket "}", and a missing catch block that corresponds to the "try" block.

The artifact 702 may be determined as being a Java code snippet at operation 304 of method 300. In these or other embodiments, the artifact 702 may be determined as being a Java code snippet using the elimination based inference operations of method 400.

The undefined tokens (" . . . ") may be identified as corresponding to undefined statements based on the operations of block 504 of method 500. In these or other embodiments, using the operations at block 508 of method 500, the undefined tokens (" . . . ") may each be replaced to generate a first modified code snippet 704 (illustrated in FIG. 7A). For example, each of the undefined tokens (" . . . ") of the artifact 702 may be replaced with the dummy statement "Object UNREC_TOKENS_STATEMENT_46_46_46" at fault locations 703 and 705 to generate the first modified code snippet 704.

Figure 7B:
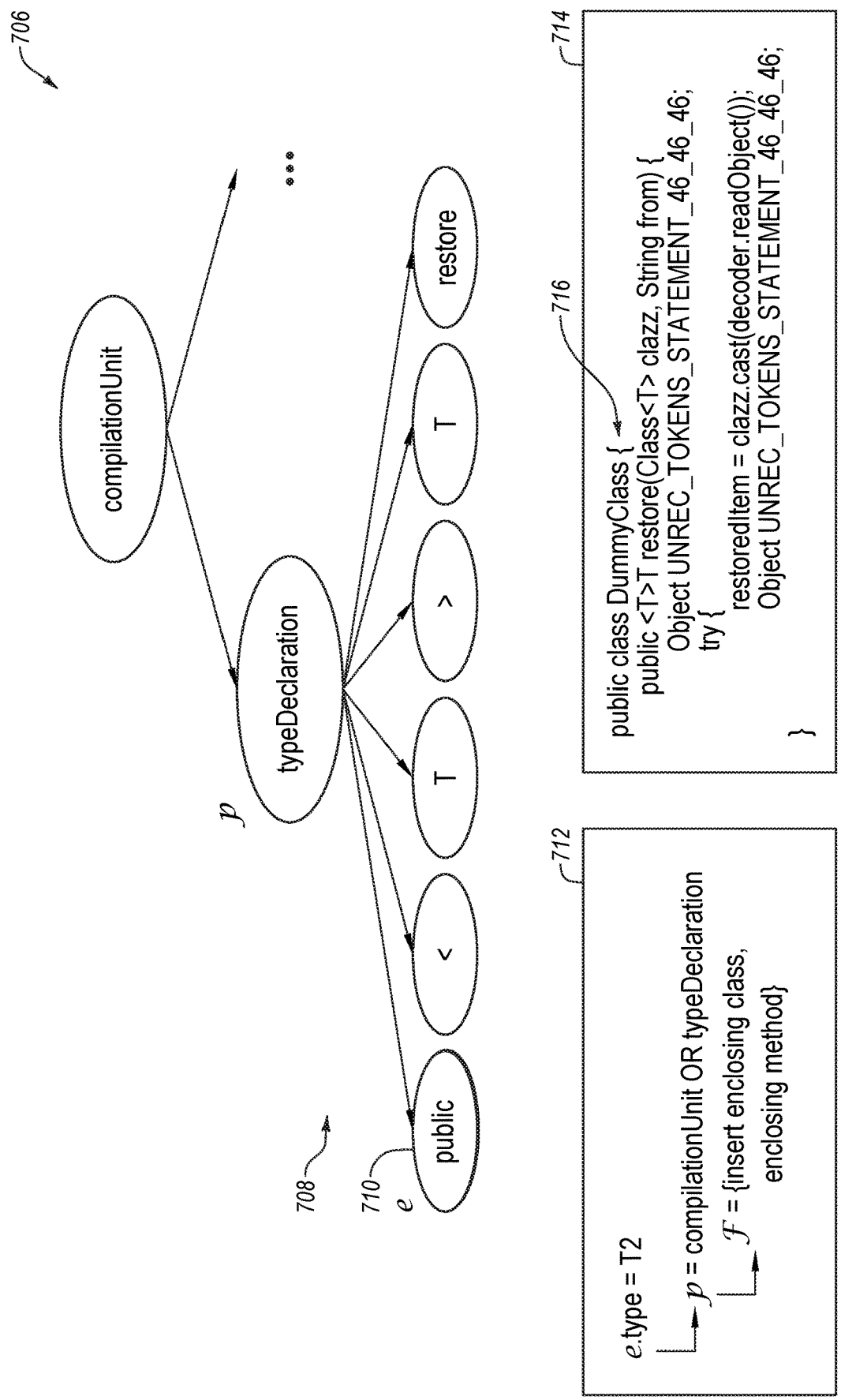

Turning to FIG. 7B, based on the operations of block 602 of method 600, a parse tree 706 may be generated with respect to the first modified code snippet 704. FIG. 7B illustrates a first portion 708 of the parse tree 706 that may include an error node 710. The error node 710 may correspond to the missing enclosing class parsing error of the artifact 702. Based on one or more operations of the method 600 and using repair operations 712 of the repair template 620 of FIG. 6B, the missing enclosing class may be inserted at fault location 716 to generate a second modified code snippet 714 from the first modified code snippet 704.

Figure 7C:
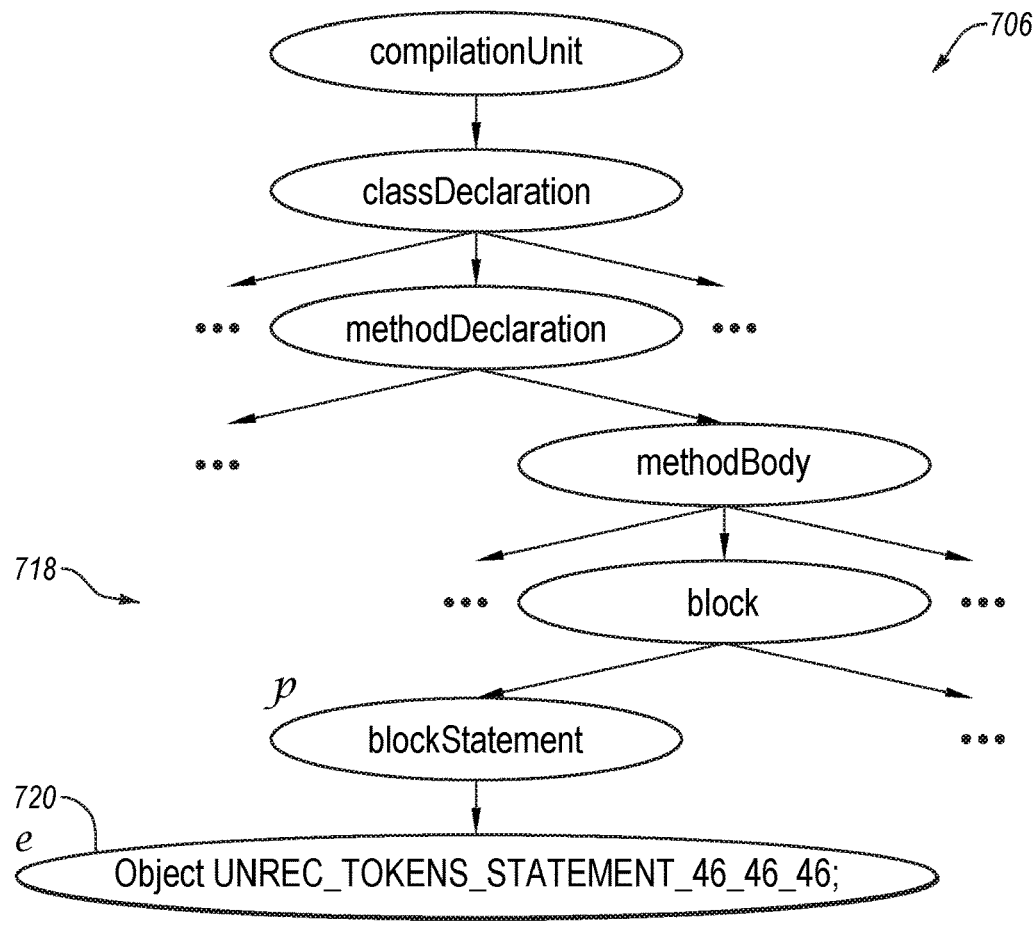

Turning to FIG. 7C, FIG. 7C illustrates a second portion 718 of the parse tree 706 that may include an error node 720. The error node 720 may correspond to a first inserted dummy statement that may correspond to a first one of the undefined tokens " . . . " of the artifact 702. Based on one or more operations of the method 600 and using repair operations 722 of the repair template 620 of FIG. 6B, the first dummy statement at fault location 703 may be replaced with a commented version of the first undefined token " . . . " to generate a third modified code snippet 724 from the second modified code snippet 714.

Figure 7D:
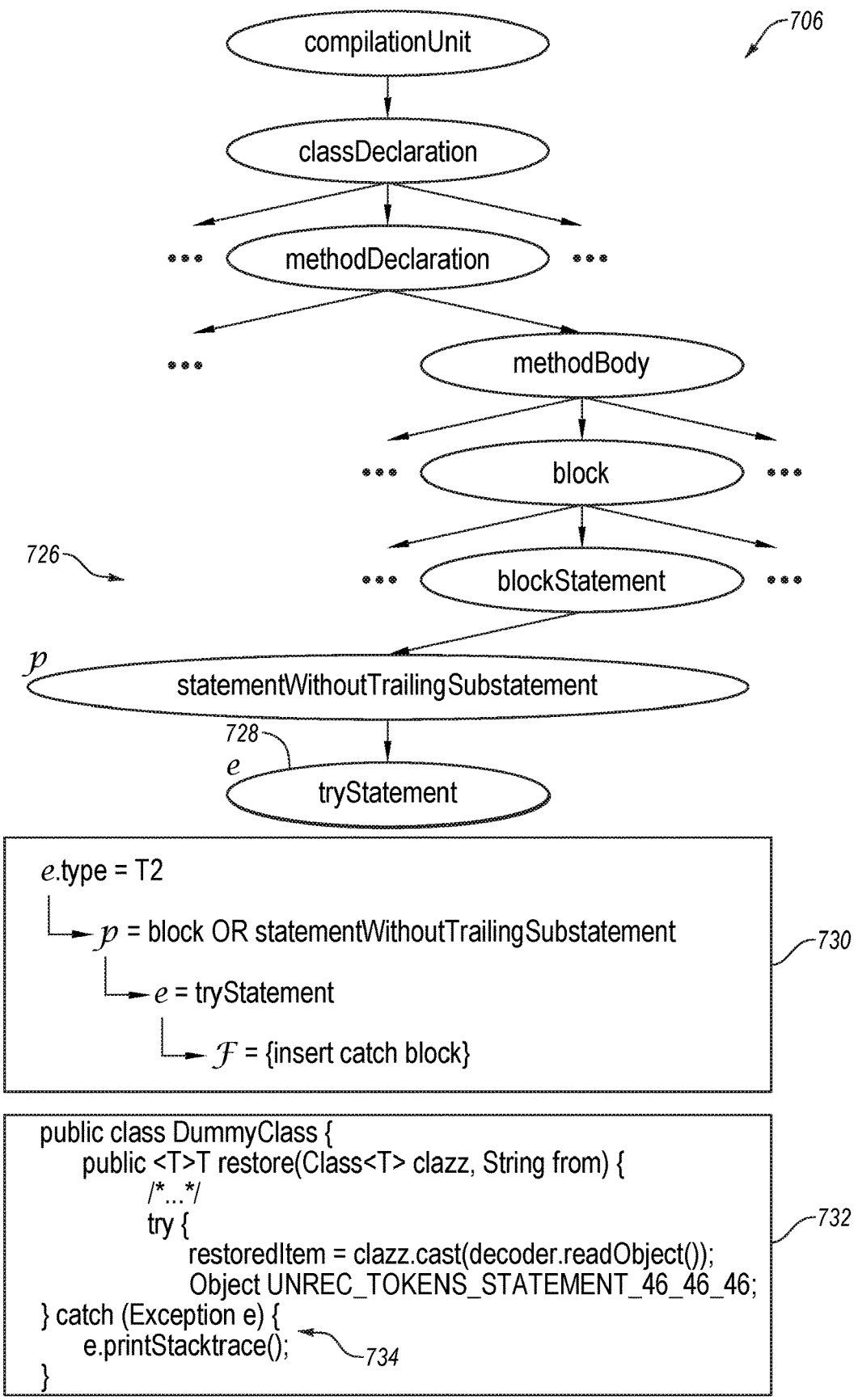

Turning to FIG. 7D, FIG. 7D illustrates a third portion 726 of the parse tree 706 that may include an error node 728. The error node 728 may correspond to the missing catch block parsing error of the artifact 702. Based on one or more operations of the method 600 and using repair operations 730 of the repair template 620 of FIG. 6B, the missing catch block may be inserted at fault location 734 to generate a fourth modified code snippet 732 from the third modified code snippet 724.

Figure 7E:
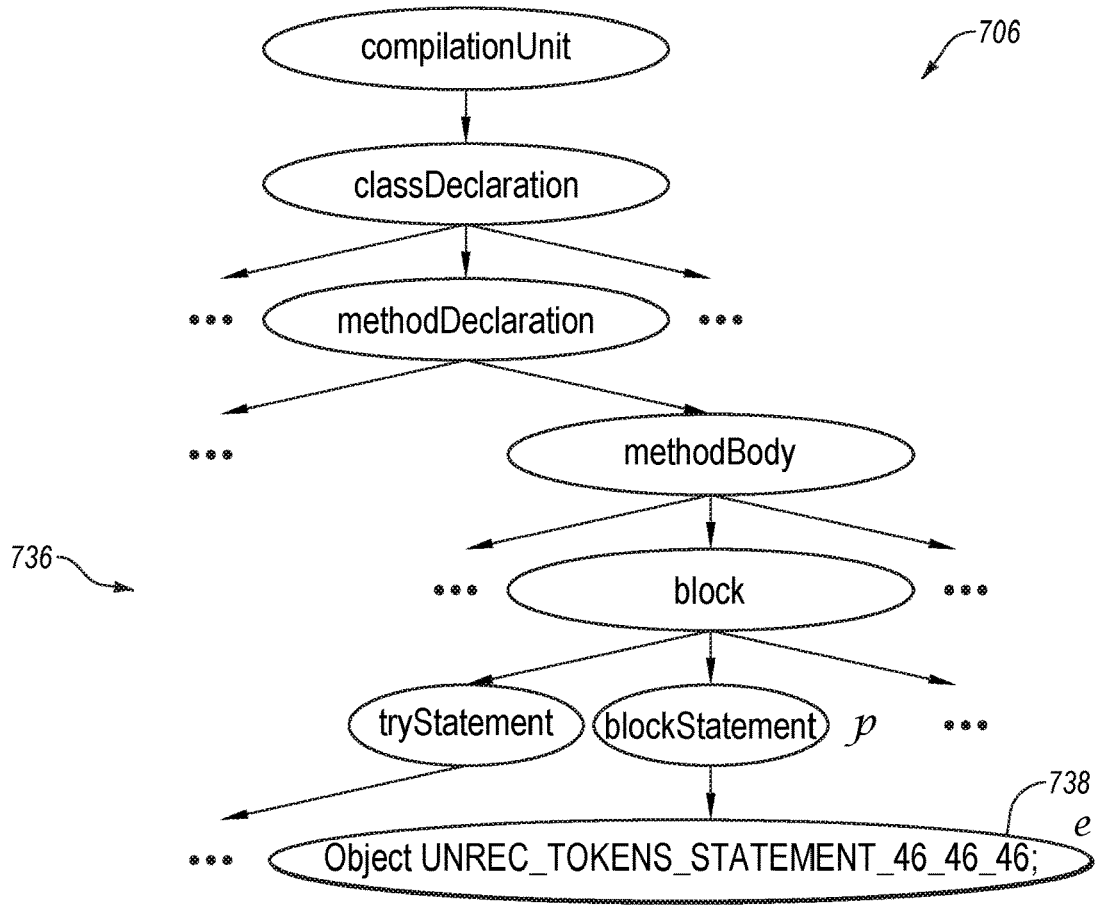

Turning to FIG. 7E, FIG. 7E illustrates a fourth portion 736 of the parse tree 706 that may include an error node 738. The error node 738 may correspond to the second inserted dummy statement that may correspond to the second one of the undefined tokens " . . . " of the artifact 702. Based on one or more operations of the method 600 and using repair operations 722 of the repair template 620 of FIG. 6B, the second dummy statement at fault location 705 may be replaced with a commented version of the second undefined token " . . . " to generate a fifth modified code snippet 740 from the third modified code snippet 732.

Figure 7F:
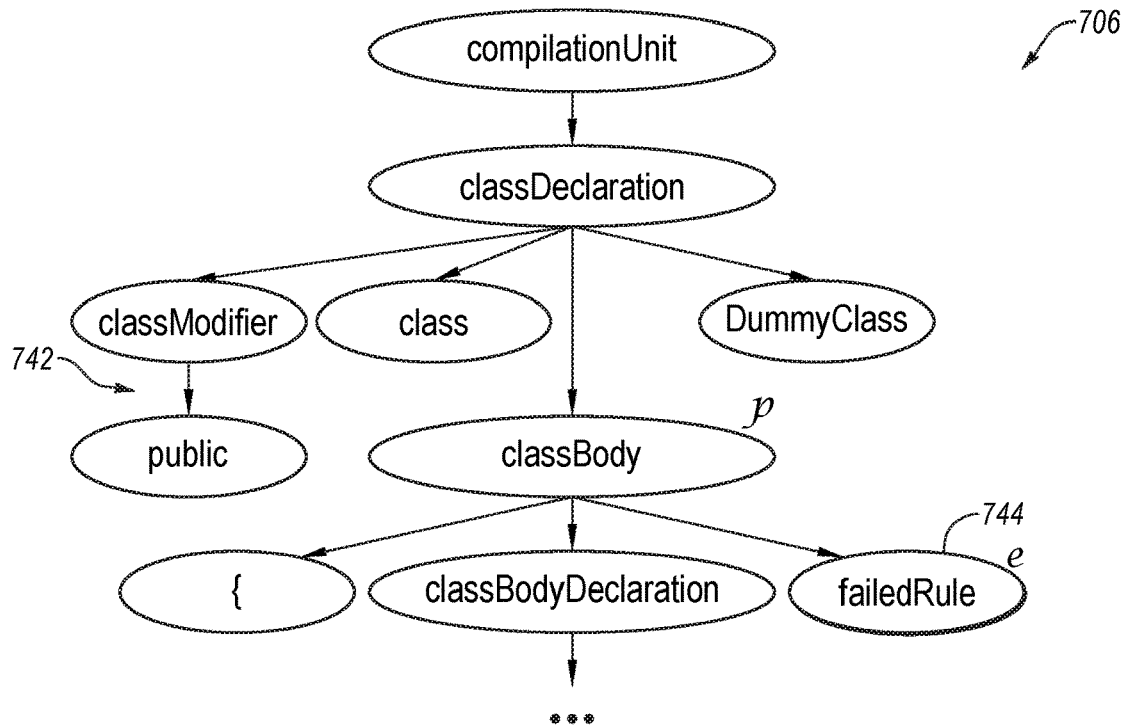

Turning to FIG. 7F, FIG. 7F illustrates a fifth portion 742 of the parse tree 706 that may include an error node 744. The error node 744 may correspond to the missing closing bracket "}" parsing error of the artifact 702. Based on one or more operations of the method 600 and using repair operations 746 of the repair template 620 of FIG. 6B, the missing closing bracket "}" may be inserted at fault location 750 to generate a sixth modified code snippet 748 from the fourth modified code snippet 740.

The sixth modified code snippet 748 may have all the parsing errors corrected. As such, the sixth modified codes snippet 748 may be a parsable code snippet generated from the unparsable code snippet of the artifact 702.

Modifications, additions, or omissions may be made to FIGS. 7A-7F without departing from the scope of the present disclosure. For example, the order of making modifications may be different than from that described. Further, two or more of the repair operations may be performed simultaneously. The above is just merely to aid in understanding as to how an unparsable code snippet may be made parsable.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." This interpretation of the phrase "A or B" is still applicable even though the term "A and/or B" may be used at times to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining a code artifact in which the code artifact includes a code snippet of a software language of interest, the code snippet including a plurality of syntax errors with respect to the software language of interest;
   identifying an undefined token in a particular line of code of the code snippet, the undefined token being undefined with respect to the software language of interest, wherein identifying the undefined token includes determining that an arrangement of characters in the particular line of code matches a regular expression that corresponds to an undefined statement or an undefined expression of the software language of interest;
   replacing the undefined token with a dummy code fragment of the software language of interest;
   identifying, as fault locations of the code snippet, portions of the code snippet that each have at least one incongruency that relates to a parsing error, one of the fault locations including the particular line of code having the dummy code fragment incorporated therein, wherein identifying the fault locations includes:
   building a parse tree of the code snippet that represents syntactic relationships of elements of the code snippet; and
   identifying error nodes of the parse tree in which each error node indicates a respective fault location; and
   implementing repairs for each identified fault location in which, for each fault location, a respective repair is implemented to correct a corresponding incongruency such that the code snippet is modified into a parsable code snippet.

2. The method of claim 1, further comprising determining that the code artifact is the code snippet of the software language of interest based on determining that the code artifact conforms to a grammar of the software language of interest through an elimination based inference.

3. The method of claim 1, wherein implementing one or more of the repairs includes identifying the one or more repairs based on an error type of the parsing error related to a corresponding incongruency.

4. The method of claim 3, wherein identifying the one or more repairs is further based on a parent node type of parent nodes of error nodes of a parse tree in which the parse tree represents syntactic relationships of elements of the code snippet and in which each error node indicates a different one of the fault locations.

5. The method of claim 1, wherein implementing one or more of the repairs includes identifying the one or more repairs from a repair template of a precompiled library of specialized repairs in which the repair template indicates which repair to select based on an error type of the parsing error related to a corresponding incongruency.

6. The method of claim 1, wherein replacing the undefined token with the dummy code fragment includes selecting a dummy statement of the software language of interest as the dummy code fragment in response to determining that the particular line of code includes an undefined statement format.

7. The method of claim 1, wherein replacing the undefined token with the dummy code fragment includes selecting a dummy expression of the software language of interest as the dummy code fragment in response to determining that the particular line of code includes an undefined expression format.

8. One or more non-transitory computer-readable media configured to store one or more instructions that, in response to being executed by at least one system, cause the at least one system to perform operations, the operations comprising:
   obtaining a code artifact in which the code artifact includes a code snippet of a software language of interest, the code snippet including a plurality of syntax errors with respect to the software language of interest;
   identifying an undefined token in a particular line of code of the code snippet, the undefined token being undefined with respect to the software language of interest, wherein identifying the undefined token includes determining that an arrangement of characters in the particular line of code matches a regular expression that corresponds to an undefined statement or an undefined expression of the software language of interest;
   replacing the undefined token with a dummy code fragment of the software language of interest;
   identifying, as fault locations of the code snippet, portions of the code snippet that each have at least one incongruency that relates to a parsing error, one of the fault locations including the particular line of code having the dummy code fragment incorporated therein, wherein identifying the fault locations includes:
   building a parse tree of the code snippet that represents syntactic relationships of elements of the code snippet; and identifying error nodes of the parse tree in which each error node indicates a respective fault location; and implementing repairs for each identified fault location in which, for each fault location, a respective repair is implemented to correct a corresponding incongruency such that the code snippet is modified into a parsable code snippet.

9. The one or more non-transitory computer-readable media of claim 8, wherein the operations further comprise determining that the code artifact is the code snippet of the software language of interest based on determining that the code artifact conforms to a grammar of the software language of interest through an elimination based inference.

10. The one or more non-transitory computer-readable media of claim 8, wherein implementing one or more of the repairs includes identifying the one or more repairs based on an error type of the parsing error related to a corresponding incongruency.

11. The one or more non-transitory computer-readable media of claim 10, wherein identifying the one or more repairs is further based on a parent node type of parent nodes of error nodes of a parse tree in which the parse tree represents syntactic relationships of elements of the code snippet and in which each error node indicates a different one of the fault locations.

12. The one or more non-transitory computer-readable media of claim 8, wherein replacing the undefined token with the dummy code fragment includes selecting a dummy statement of the software language of interest as the dummy code fragment in response to determining that the particular line of code includes an undefined statement format.

13. The one or more non-transitory computer-readable media of claim 8, wherein replacing the undefined token with the dummy code fragment includes selecting a dummy expression of the software language of interest as the dummy code fragment in response to determining that the particular line of code includes an undefined expression format.

14. A system comprising:
one or more computer-readable storage media configured to store instructions; and
one or more processors communicatively coupled to the one or more computer-readable storage media and configured to, in response to execution of the instructions, cause the system to perform operations, the operations comprising:
obtaining a code artifact in which the code artifact includes a code snippet of a software language of interest, the code snippet including a plurality of syntax errors with respect to the software language of interest;
identifying an undefined token in a particular line of code of the code snippet, the undefined token being undefined with respect to the software language of interest;
identifying, as fault locations of the code snippet, portions of the code snippet that each have at least one incongruency that relates to a parsing error, wherein identifying the fault locations includes:
building a parse tree of the code snippet that represents syntactic relationships of elements of the code snippet; and
identifying error nodes of the parse tree in which each error node indicates a respective fault location; and
implementing repairs for each identified fault location in which, for each fault location, a respective repair is implemented to correct a corresponding incongruency such that the code snippet is modified into a parsable code snippet.

15. The system of claim 14, wherein the operations further comprise:
replacing the undefined token with a dummy code fragment of the software language of interest, wherein one of the fault locations includes the particular line of code having the dummy code fragment incorporated therein.

* * * * *